Patented Sept. 27, 1932

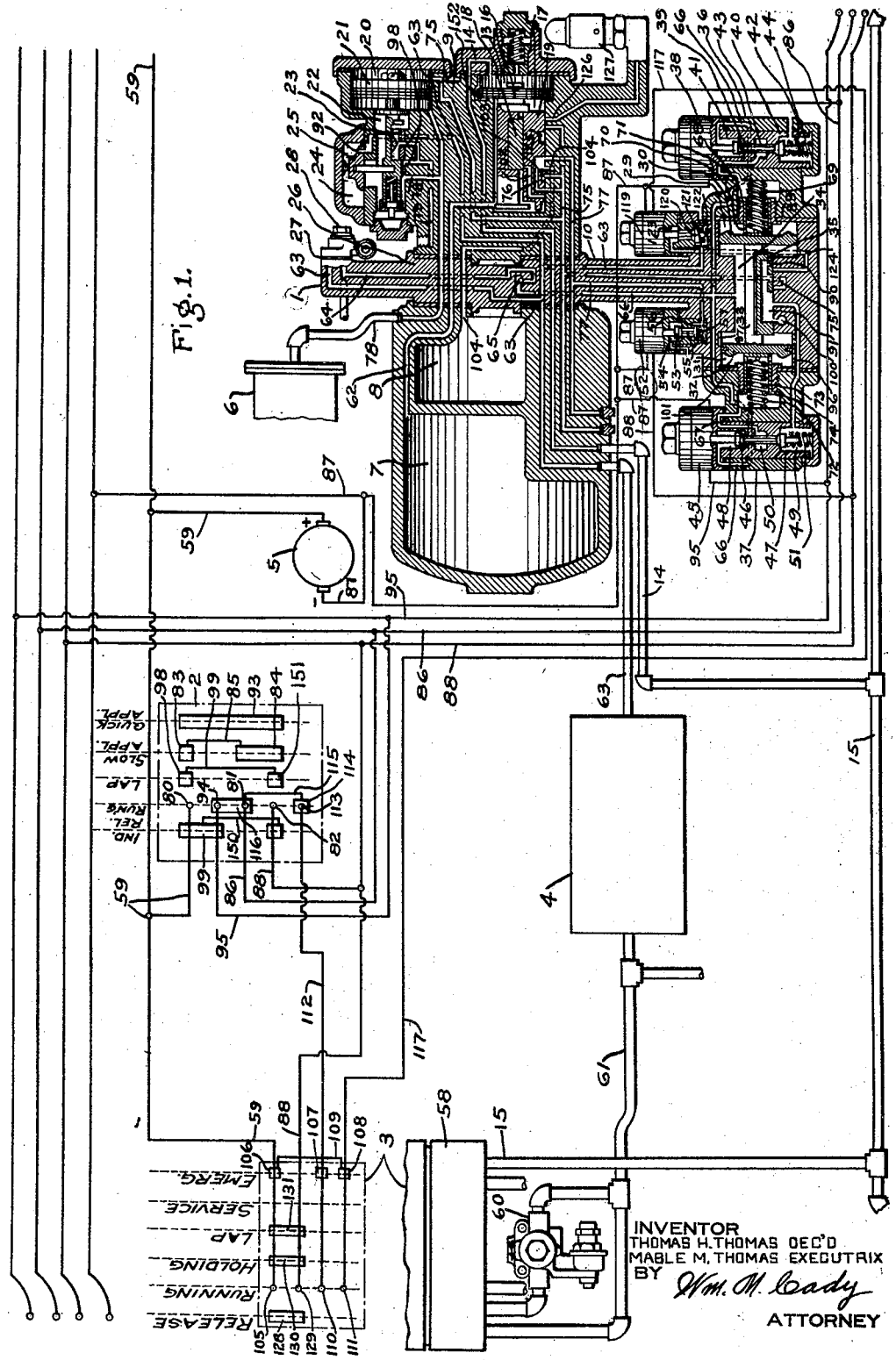

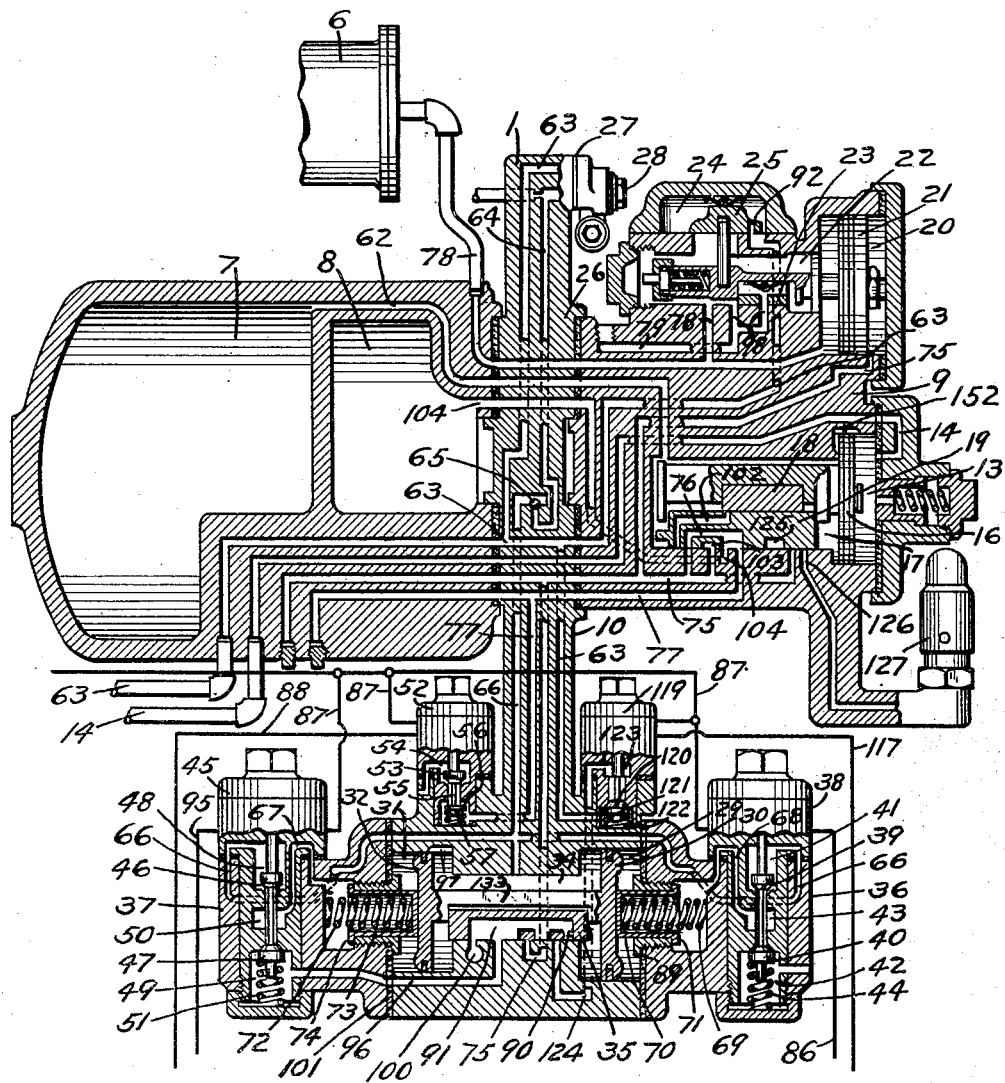

1,879,646

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed October 17, 1929. Serial No. 400,240.

This invention relates to electro-pneumatic brakes and more particularly to an electrically controlled fluid pressure brake equipment for locomotives.

In the usual locomotive fluid pressure brake equipment, a distributing valve device is employed for controlling the application and release of brakes. The distributing valve device in turn may be controlled by varying the pressure in a brake pipe by the operation of an automatic brake valve device, in which case the brakes on the train operate in unison with the brakes on the locomotive. However, if it is desired to operate the locomotive brakes only, then the distributing valve device is controlled by operating an independent brake valve device.

In a locomotive brake equipment of the above type, the brake valve devices are located in the cab, which usually is at each end of the locomotive, while the distributing valve device may be located remote from said brake valve devices. A considerable length, and therefore volume, of pipe is thus required to connect these devices, which obviously retards the flow of fluid under pressure and consequently hinders the build up or release of pressure effective in the distributing valve device, thus delaying the operation thereof. Furthermore, in case of breakage of any of said pipes, the brakes on the locomotive may be undesirably released, in case of being applied, or such breakage may prevent an application of the brakes from being effected.

One object of the invention is to provide an improved distributing valve device including means for controlling the operation thereof electrically, by the operation of an independent brake switch device.

Another object of the invention is to provide electrically controlled means for maintaining the pressure obtained in a brake cylinder, after an emergency application of the brakes is effected by suddenly venting the fluid under pressure from the brake pipe to the atmosphere.

Other objects and advantages will appear in the following more detailed description of the invention.

In the accompanying drawings, Figure 1 is a diagrammatic view of a locomotive brake equipment embodying the invention; and Fig. 2 is an enlarged view of the distributing valve device shown in Fig. 1.

As shown in the drawings, the brake equipment comprises a distributing valve device 1, an independent brake switch device 2, a combined automatic brake valve device and switch 3, a source of electrical energy, preferably a generator 5, a main reservoir 4 and a brake cylinder 6.

The distributing valve device comprises a reservoir portion containing the usual pressure chamber 7 and application chamber 8, a valve portion 9 and a magnet portion 10 interposed between said reservoir portion and valve portion.

The valve portion 9 of the distributing valve device 1 comprises an equalizing portion and an application portion.

The equalizing portion of the distributing valve device comprises a casing having a piston chamber 13, connected through a passage and pipe 14 to the usual brake pipe 15, and containing an equalizing piston 16, and a valve chamber 17 containing an auxiliary slide valve 18 and a main slide valve 19 adapted to be operated by said piston.

The application portion of the distributing valve device comprises a casing having a piston chamber 20 containing a piston 21, a valve chamber 22 containing an exhause valve 23 and a valve chamber 24 containing an application valve 25, said valves being connected to said piston and adapted to be operated thereby.

The magnet portion 10 of the distributing valve device is preferably built in the form of a filling piece 26, which may be interposed between the reservoir portion and valve portion 9, as shown on the drawings, and comprises a casing having a gasket face 27, on which is mounted a reducing valve device 28 of the usual well known structure.

The casing of the magnet portion 10 has a chamber 29 containing a piston 30 and a chamber 31 containing a piston 32 of smaller area than piston 30. The pistons 30 and 32 are connected together by a stem 33. Intermediate the pistons 30 and 32 is formed a chamber 34 containing a slide valve 35 adapted to be operated by said pistons.

In piston chamber 29 is a compressible coil spring 69, one end of which is mounted in a sleeve-like member 70 which is adapted to slidably operate through a bore in the casing, a shoulder 71 being formed on said member to limit movement to the left. Likewise in piston chamber 31 is a compressible coil spring 72, one end of which is carried by the member 73 having a shoulder 74 for limiting movement to the right. When the pressures acting on the opposite sides of the pistons 30 and 32 are equal, springs 69 and 72 are adapted to force said pistons to an intermediate position, as shown in the drawings, in which shoulders 71 and 74 of members 70 and 73, respectively, engage the casing.

For controlling the operation of the pistons 30 and 32, magnet valve devices 36 and 37 are provided.

The magnet valve device 36 comprises a magnet 38 and valves 39 and 40 adapted to be operated by said magnet. The valve 39 is contained in a chamber 41 and the valve 40 is contained in a chamber 42, said valves having fluted stems extending into a chamber 43. Upon energization, the magnet 38 is adapted to seat valve 39 and unseat valve 40 against the pressure of a spring 44 in chamber 42, said spring being adapted to seat valve 40 and unseat valve 39, when the magnet 38 is deenergized.

The magnet valve device 37 comprises a magnet 45 and valves 46 and 47 adapted to be operated by said magnet. The valve 46 is contained in a chamber 48 and the valve 47 is contained in a chamber 49, said valves having fluted stems abutting in a chamber 50. Upon energization, the magnet 45 is adapted to seat valve 46 and unseat valve 47 against the pressure of a spring 51, said spring being adapted to seat valve 47 and unseat valve 46, when the magnet 45 is deenergized.

For controlling the release of the brakes, a release magnet valve device is provided comprising a magnet 52 and a valve 53 controlled by the operation of said magnet. The valve 53 is contained in a chamber 54 and has a fluted stem 55 extending into a chamber 56, wherein said stem engages a spring pressed plunger 57 which is adapted to urge said valve away from its seat.

For maintaining the pressure obtained in the locomotive brake cylinder 6 in an emergency application of the brakes, a magnet valve device is provided comprising a magnet 119 and a valve 120 adapted to be operated by said magnet, the valve 120 being contained in a chamber 121. A spring 122 in said chamber urges the valve 120 towards its seat.

The independent brake switch device 2 is shown in diagrammatic development form and may comprise a plurality of fixed contacts connected to various control wires, and a plurality of movable contacts mounted on a movable drum in such a manner, that in the various brake control positions of the drum, certain fixed contacts will engage certain movable contacts in order to establish electric circuits for controlling the operation of the distributing valve device in governing the locomotive brakes, in a manner to be fully described hereinafter.

The combined automatic brake valve and switch device 3 may comprise the usual well known automatic brake valve device 58 and a switch portion adapted to be operated with the brake valve device. The automatic switch device portion may comprise a plurality of fixed contacts connected to various control wires and a plurality of movable contacts mounted on a movable drum in the same manner as the independent switch device.

In the drawings both the independent brake switch and automatic brake switch are shown in their normal running positions in which the train and locomotive brakes are released. To indicate these positions, the fixed contacts in both devices are shown in the running position.

In operation, to prepare the equipment for controlling the brakes on the locomotive and train (not shown) the brake switch devices are turned to the running position, as shown in the drawings. Electrical current is thereby permitted to flow from the generator 5 through supply wire 59 to the independent and automatic brake switch devices 2 and 3. However, in neither of said switch devices is the wire 59 connected to a movable contact, therefore the circuit through the magnet of each magnet valve device on the distributing valve device is opened, so that said magnets are normally deenergized.

Fluid under pressure supplied to the main reservoir 4 flows therefrom to the usual feed valve device 60 through a pipe 61 and from said feed valve device through the brake valve device 58 to the brake pipe 15, thereby charging said brake pipe in the usual well known manner.

Fluid at the pressure supplied to the brake pipe 15 flows therefrom through pipe and passage 14 to the equalizing piston chamber 13 of the distributing valve device. In the piston chamber 13, brake pipe pressure acts on piston 16, shifting said piston to the release position, as shown in the drawing; in which position fluid under pressure is permitted to flow from said piston chamber through a feed groove 152 around said piston to valve chamber 17 and from thence through a passage 62 to the pressure chamber 7, charging said chambers.

Fluid under pressure also flows from main reservoir 4 through pipe and passage 63 to the application valve chamber 24 and reducing valve device 28. The reducing valve device reduces the pressure from that carried in the main reservoir to that generally employed in independent applications of the locomotive brakes and supplies fluid at said reduced pressure to passage 64, from whence it flows past a ball check valve 65, and through passage 66 to slide valve chamber 34, magnet valve chamber 48 and magnet valve chamber 41.

The magnet 45 is deenergized when the brake switch is in running position, as hereinbefore described. Consequently, spring 49 seats valve 47 and unseats valve 46, which permits fluid at feed valve pressure to flow from chamber 48 to chamber 50 and from thence through passage 67 to piston chamber 31. The magnet 38 is also normally deenergized, so that spring 44 seats valve 40 and unseats valve 39, which permits fluid at feed valve pressure to flow from valve chamber 41 to chamber 43 and from thence through passage 68 to piston chamber 29. Thus, the fluid pressure in valve chamber 34 acting on the inner faces of pistons 30 and 32 is balanced by the pressures in piston chambers 31 and 29.

When the fluid pressures acting on the opposite sides of pistons 30 and 32 are thus equal, the opposing pressures of springs 69 and 72 maintain said pistons and the slide valve 35 in an intermedite, normal or running position, as shown in the drawings.

As hereinbefore described, the release magnet 52 is normally deenergized and with the equalizing slide valve 19 in release position, the application cylinder 20 is connected to the atmosphere through passage 75, cavity 76 in said slide valve, passage 77, chamber 56, past the unseated release magnet valve 53 and through the atmospheric chamber 54.

With the application cylinder 20 thus at atmospheric pressure, the application piston 21, application slide valve 25 and exhaust slide valve 23 assume their release position as shown in the drawings as will be fully explained hereinafter. With the exhaust slide valve in the release position, the brake cylinder 6 is connected to the atmosphere through pipe and passage 78, valve chamber 22 and atmospheric passage 79.

If it is desired to effect a slow application of the brakes on the locomotive, the independent brake switch is turned to slow application position, in which position stationary contact 80 is brought into engagement with movable contact 83 and stationary contacts 81 and 82 are brought into engagement with movable contact 84. Contacts 83 and 84 are joined by a connector 85. Current supply wire 59 is connected to contact 80, so that electric current supplied by generator 5 is permitted to flow from contact 80 through contact 83, connector 85, and contact 84 to contacts 81 and 82.

Contact 82 is connected through wire 88 to magnet 52 which is connected through a return wire 87 to the generator 5. Likewise, contact 81 is connected through a wire 86 to magnet 38 which is also connected to return wire 87. Thus an electric circuit is closed through magnets 52 and 38, energizing said magnets, however, the magnets 45 and 119 remain deenergized when a slow application of the brakes is effected.

The energization of magnet 52 seats the release valve 53, so as to close the atmospheric connection from the application cylinder 20 through passage 75, cavity 76 in equalizing slide valve 19 and passage 77 to atmospheric chamber 54.

The energization of magnet 38 seats valve 39, cutting off the supply of fluid under pressure from chamber 41 to chamber 43 and unseats valve 40 which connects chamber 43 to chamber 42, which permits venting of the fluid under pressure from piston chamber 29 through passage 68, chamber 43 to the atmospheric chamber 42. The piston chamber 31 and valve chamber 34 being charged with fluid at equal pressures, the pressure acting on the left side of piston 30 then shifts the pistons 30 and 32 and slide valve 35 to the right, to application position, in which position piston 30 compresses the spring 69 and engages a gasket 89.

In application position of slide valve 35, a restricted port 90 is connected to valve chamber 34, which permits fluid at the pressure supplied by feed valve device 28 to valve chamber 34 to flow thru said port to cavity 91 in said slide valve and from thence thru passage 75 to the application cylinder 20. The build up of pressure in the application cylinder on the application piston 21, shifts said piston to the left, causing exhaust valve 23 to lap the exhaust passage 79 and a port 92 in the application slide valve 25 to register with chamber 22, which permits fluid supplied from the main reservoir 5 to valve chamber 24 to flow therefrom thru chamber 22 and passage and pipe 78 to the brake cylinder 6, so as to apply the brakes.

The pressure in the valve chamber 22 acts on the left side of application piston 21 due to the connection through passage 78 and when the pressure on the left side of said piston slightly exceeds the pressure acting on the right side of said piston, then the piston 21 is shifted to the right, which pulls the application valve 25 to the right, thereby lapping port 92 and preventing further increase in brake cylinder pressure. In this manner, the pressure obtained in the brake cylinder 6 is equal to the pressure of fluid supplied to application cylinder 20.

It will be noted that the rate of pressure built up in the application cylinder 20 is governed by the flow area of restricted port 90 in slide valve 35, when a slow application of the locomotive brakes is effected.

If it is desired to effect a quick application of the locomotive brakes, the independent brake switch is turned to quick application position, in which the same electrical connections are made as in slow application position, in that a movable contact 93 connects stationary contact 80 with stationary contacts 81 and 82, but in addition, the movable contacts 93 connects with a stationary contact 94. As a result, the magnet 52 is energized to close the exhaust connection from application cylinder 20, and the magnet 38 is energized to cause the pistons 30 and 32 and slide valve 35 to move to application position to supply fluid under pressure to the application cylinder in the same manner as hereinbefore described. However, electric current is also permitted to flow from supply wire 59 through movable contact 93 and stationary contact 94 to wire 95 and from thence thru magnet 45 and return wire 87 to generator 5, thereby energizing magnet 45.

Energization of magnet 45 seats valve 46 and unseats valve 47. Seating of valve 46 cuts off the supply of fluid under pressure to chamber 50 and from thence to piston chamber 31, and unseating of valve 47 connects piston chamber 31 through passage 67 and chamber 50 to valve chamber 49 and from thence through a passage 96 to cavity 91 in the slide valve 35, thru which fluid under pressure is being supplied to the application cylinder 20 at a rate governed by restricted port 90 in said slide valve, in the same manner as when a slow application of the brakes is effected.

As just described, when a quick application of the brakes is effected, the piston chamber 29 is vented in the same manner as when a slow application of the brakes is effected, but in addition, fluid under pressure is also permitted to flow from piston chamber 31 to the application cylinder. The pistons 30 and 32 move to the right or application position, however, due to piston 30 being of larger area than piston 32, so that the total pressure exerted on the inner face of piston 30 is greater than the total pressure exerted on the inner face of piston 32.

With the piston 32 in application position, a feed port 97 connects the opposite sides of said piston, which permits fluid under pressure to flow from valve chamber 34 to piston chamber 31 and from said chamber through passage 67, chamber 50, chamber 49, and passage 96 to cavity 91 in slide valve 35 and from thence to the application cylinder 20 in the manner hereinbefore described. Thus, it will be noted, that when a quick application of the brakes is effected, fluid under pressure is supplied to the application cylinder in two different ways, namely, by way of restricted port 90 in the slide valve 35 and through feed port 97 around piston 32, and the rate of build up in the application cylinder exceeds that obtained when a slow application of the brakes is effected, by a degree equal to the flow area of port 97.

If it is desired to limit the degree of brake application obtained in either slow or quick application position of the independent brake switch device, or if it is desired to graduate the brakes on in steps, then when the desired pressure is obtained in the application cylinder 20 and consequently in the brake cylinder 6, the brake switch is turned from the application position to lap position, in which position electric current is permitted to flow from supply wire 59 through stationary contact 80, movable contact 98, connector 99, movable contact 151 to stationary contact 82 and from thence through wire 88, release magnet 52, return wire 87 and to generator 5. Thus, the release magnet 52 is the only magnet energized, and it holds valve 53 seated and prevents venting of fluid under pressure from the application cylinder 20. With magnets 38 and 45 both deenergized in lap position of the brake switch, the piston chambers 29 and 31 are charged with fluid under pressure and said pistons and slide valve 35 are operated to their intermediate position, as shown in the drawings and described in initially charging the equipment. In this position of slide valve 35, fluid under pressure is prevented from flowing through port 90 and feed port 97 to the application cylinder. Thus, the fluid under pressure in the application cylinder 20 is bottled up.

To release an application of the brakes, the brake switch device may be turned to running position, in which the stationary contact 80, connected to current supply wire 50, makes no connection in the brake switch, and with the combined brake valve and switch device 3 in running position, the release magnet wire 88 connected to contact 129 is not connected to the contact 105 on current supply wire 59. Consequently, all the magnets on the distributing valve device are deenergized. This is exactly the same as when the brake switch is in lap position except in addition the release magnet 52 is also deenergized, which permits spring pressed plunger 57 to unseat valve 53 and thus permit fluid under pressure to flow from the application cylinder 20 to the atmosphere through passage 75, cavity 76 in the equalizing slide valve 19, passage 77, past valve 53 and through atmospheric chamber 54.

When the pressure is reduced in the application cylinder 20, the pressure of the fluid in valve chamber 22 shifts the piston 21, and slide valves 25 and 23 to the release position, as shown in the drawings, in which position, fluid under pressure is permitted to flow from the brake cylinder 6 through pipe and passage 78, valve chamber 22, ports 98 in the slide valve seat and passage 79.

It will be noted that in releasing the brakes as just described, that the combined brake valve and switch device 3 must be in running position, since in release, holding and lap positions, current is supplied to energize the release magnet 52 to prevent a release.

If it is desired to effect a release of the brakes independently of the position of the combined brake valve and switch device 3, the independent brake switch is turned to independent release position, in which position electric current is permitted to flow from supply wire 59 thru stationary contact 80 to movable contact 99 which stationary contact 94 engages, and from contact 99 through connector 150 to stationary contact 82.

Electric current is thus permitted to flow from stationary contact 94 through wire 95 to magnet 45 and from thence through return wire 87 to generator 5, thus energizing magnet 45, and also from stationary contact 82 through wire 88 to release magnet 52 and from thence through return wire 87 to generator 5 thus energizing magnet 52.

The energization of magnet 52 seats release valve 53, thus preventing the flow of fluid under pressure from the application cylinder 20 to the atmosphere past said valve, as takes place in releasing the brakes in running position of the independent brake switch. The energization of magnet 45 seats valve 46 and unseats valve 47, thus venting fluid under pressure from the piston chamber 31 to the atmosphere by way of passage 67, chamber 50, chamber 49, passage 96, cavity 91 in slide valve 35 and atmospheric passage 100. The magnet 38 not being energized in quick release position of the independent brake switch permits fluid under pressure to be supplied to piston chamber 29 from passage 66 through chamber 41, chamber 43 and passage 68. With fluid under pressure vented from piston chamber 31, the pressure in piston chamber 29 shifts pistons 30 and 32 and slide valve 35 to the left until piston 32 engages the gasket 101. In this position of slide valve 35, passage 75 from the application cylinder 20 is connected to cavity 91 in said slide valve and thereby permits fluid under pressure to flow from application piston chamber 20 to cavity 91 and from thence to the atmosphere thru passage 100, so as to vent fluid under pressure from the brake cylinder 6 in the same manner as described in releasing the brakes in running position of the independent brake switch.

From the above description, it will be noted that there are two positions of the independent brake switch device in which the brakes may be released, the independent release position being a position in which the locomotive brakes may be released at any time, whereas the release in running position necessitates that the combined brake valve and switch device be also in running position, as will be further described hereinafter.

This electrically controlled locomotive brake equipment is so designed that the distributing valve device will operate in harmony with the valve devices on a train, when said valve devices are operated by varying the pressure of the fluid in the brake pipe 15 by operation of the automatic brake valve device 58, in the usual well known manner.

When not controlling the brakes by the independent brake switch device 2, said device is carried in the running position as shown in the drawings. Then, to effect an application of the locomotive and train brakes by operation of the combined automatic brake valve and switch device 3, said device is turned to service position, in which the pressure of the fluid in brake pipe 15 is gradually reduced in the usual manner. The pressure in equalizing piston chamber 13 reduces with brake pipe pressure, thereby permitting the pressure of fluid in the equalizing valve chamber 17 to shift the piston 16 and slide valves 18 and 19 to service position, in which the graduating valve 18 uncovers the service port 102 in the main slide valve 19 and said port registers with passage 75 connected to the application cylinder 20. Fluid under pressure is thus permitted to flow from the pressure chamber 7 through valve chamber 17, service port 102 and passage 75 to the application cylinder 20 and also from passage 75 through cavity 103 in slide valve 19 and passage 104 to the application chamber 8. The pressure of fluid in the application cylinder 20 acting on the application piston 21 causes the brakes to be applied in the same manner as hereinbefore described.

If it is desired to limit the degree of a service brake application, then after a predetermined reduction in brake pipe pressure is effected, the brake valve device is turned from service to lap position, in which position further change in brake pipe pressure is prevented. Then, when the degree of reduction in equalizing valve chamber 17 slightly exceeds the degree of brake pipe reduction, the equalizing piston 16 shifts the graduating valve 18 to the left and laps service port 102, so as to prevent further flow of fluid under pressure to the application cylinder 20.

If the combined automatic brake valve and switch 3 is moved to emergency position, the fluid under pressure is suddenly vented from the equalizing piston chamber 13, causing the equalizing piston 16 to move the slide valves 18 and 19 to emergency position, in which position passage 75 is uncovered by slide valve 19, thereby permitting fluid under pressure to flow from the pressure chamber 7 directly to the application chamber 20 to effect an emergency application of the brakes in the usual manner.

The current supply wire 59 is connected to a stationary contact 105 in the automatic brake valve and switch, and in emergency position of the brake switch, said contact is engaged by a movable contact 106, which is connected to movable contacts 107 and 108 by a connector 109. A stationary contact 110 is adapted to engage movable contact 107 and another stationary contact 111 is adapted to engage movable contact 108 in emergency position of the brake switch device. As a result, when the brake switch is in emergency position, electric current is permitted to flow from supply wire 59 to movable contacts 107 and 108. Current supplied to contact 107 flows through wire 112 to a stationary contact 113 in the independent brake switch device. With the independent brake switch in running position, in which it is normally carried, stationary contact 113 is engaged by a movable contact 114 which is connected by a connector 115 to a movable contact 116 engaging stationary contacts 94 and 81, which are connected thru wires 95 and 86 to magnets 45 and 38 respectively, thereby energizing said magnets, which causes the differential pistons 30 and 32 to shift slide valve 35 to its right hand position and supply fluid under pressure to the application chamber 20 in the same manner as when a quick application of the brakes is effected by operation of the independent brake switch device. It will thus be noted that when an emergency application of the brakes is effected, fluid under pressure is supplied to the application cylinder 20 by the operation of the electric portion of the distributing valve device, as well as by the operation of the equalizing portion.

Electric current supplied to the stationary contact 111 of the automatic brake switch flows through wire 117 to the maintaining magnet 119 and from thence through return wire 87 to generator 5, so that magnet 119 is energized, when effecting an emergency brake application. Energization of magnet 119 unseats valve 120, which permits fluid at main reservoir pressure to flow from passage 63 past said valve to chamber 123 and passage 124, which is uncovered by slide valve 35. Fluid under pressure is thus permitted to flow from passage 124 to cavity 91 in slide valve 35 and from thence through passage 75 to application cylinder 20, for maintaining the pressure therein against possible leakage therefrom. For limiting the pressure, however, to a predetermined desired degree, passage 75 from the application cylinder 20 is connected through a cavity 125 in the equalizing slide valve 19 and a passage 126, which registers with said cavity in emergency position of the slide valve, with a safety valve device 127. The safety valve device 127 may be of the usual structure and has a capacity in excess of the flow rate past the maintaining valve 120, so as to prevent a pressure building up in the application cylinder 20 greater than the safety valve device is adjusted to permit.

The safety valve device may be adjusted to permit a pressure to develop in the application cylinder 20 greater than the pressure supply by the reducing valve device 28 through passage 64, past ball check valve 65 and through passage 66 to valve chamber 34. The pressure in valve chamber 34 may build up to that permitted by the safety valve device, since said valve chamber is connected to the application cylinder 20 through port 90 in slide valve 35 and passage 75. The ball check valve 65, however, prevents the high pressure obtained in chamber 34 from becoming effective at the reducing valve device 28, which device may also apply fluid at a reduced pressure through a choked passage 126 and a pipe 127 to other fluid pressure operated devices such as a signal system (not shown).

In order to release the brakes after an application of the brakes has been made, the combined automatic brake valve and switch device may be turned to release position in which fluid at main reservoir pressure is supplied to the brake pipe 15 and then after a certain degree of time, dependent upon train conditions, such as train length and brake pipe pressure carried, the combined automatic brake valve and switch device may be turned from release to running position in which fluid under pressure is supplied to the brake pipe 15 from the feed valve device 60.

Fluid under pressure supplied to the brake pipe 15 flows therefrom to equalizing piston chamber 13, wherein said pressure acts to shift the equalizing piston 16 and slide valves 18 and 19 to release position, as shown in the drawings.

In release position of the automatic brake switch, electric current from supply wire 59 flows through stationary contact 105, a movable contact 128 and a stationary contact 129 to wire 88 leading to the release magnet 52. The release magnet is thereby energized, seating valve 53, so that although the equalizing slide valves are in release position, fluid under pressure cannot flow from the application chamber 20 through passage 75, cavity 76 in the equalizing slide valve, passage 77 and past valve 53 to the atmosphere. However, when the combined automatic brake valve and switch device is moved to running position, the circuit through magnet 52 is opened, thereby permitting the fluid under pressure to flow from the application cylinder 20 to the atmosphere to effect a release of the locomotive brakes.

As in the usual fluid pressure locomotive brake equipment, a holding position is provided in the combined automatic brake valve and switch device, in which position the train brakes may be released and the distributing valve device may be moved to release position by supplying fluid under pressure from the feed valve device 60 to the brake pipe, but the locomotive brakes are prevented from releasing. This is accomplished by supplying electric current to energize release magnet 52 by way of electric supply wire 59, stationary contact 105, movable contact 130, stationary contact 129 and wire 88, and maintaining said magnet energized in the same manner as in release position.

A stationary contact 131 is provided in the automatic brake valve and switch device to close a circuit through release magnet 52, so as to prevent a release of the locomotive brakes in lap position, when the release of train brakes is being graduated. In graduating the release of train brakes, the brake pipe pressure is initially increased a predetermined amount by placing the brake valve device in release or running position, and then the brake valve device is turned to lap position. This increase in brake pipe pressure causes the equalizing piston 16 to move the slide valves 18 and 19 to release position in which they remain when the brake valve device is turned to lap position. However, energization of the release magnet 52 prevents the venting of fluid under pressure from the application cylinder 20.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a locomotive brake equipment, the combination with a brake pipe and a brake cylinder, of a valve device operative upon a sudden reduction in brake pipe pressure for supplying fluid under pressure to said brake cylinder to apply the locomotive brakes, discharge valve means for limiting the pressure of fluid obtained in said brake cylinder, a brake valve device having an emergency position for suddenly reducing the brake pipe pressure, and electrically controlled means operative in emergency position of said brake valve device for maintaining the pressure in said brake cylinder against leakage at the adjustment of said discharge valve means.

2. In a locomotive brake equipment, the combination with an application valve device for controlling the locomotive brakes, of a pair of connected pistons, a slide valve operative by said pistons for controlling the operation of said application valve device, magnet valve devices for controlling said pistons, and a manually operative brake switch for controlling circuits through said magnet valve devices.

3. In a locomotive brake equipment, the combination with an application valve device for controlling the locomotive brakes, of connected pistons of different areas, a slide valve operative by said pistons and having a plurality of positions for governing the operation of said application valve device, magnet valve devices and resilient means for controlling the position of said pistons, and a brake switch device operative to control said magnet valve devices.

4. In a locomotive brake equipment, the combination with a brake pipe, of an equalizing valve device operative in accordance with variations in brake pipe pressure for controlling the locomotive brakes and having a release position, of means operative only in the release position of said equalizing valve device to also control the release of the locomotive brakes, and a brake switch for controlling the operation of said means, said means comprising a plurality of connected pistons, a slide valve operative by said pistons for controlling the application and release of the brakes and magnet valve devices operative in accordance with the position of said brake switch for controlling the operation of said pistons.

5. In a locomotive brake equipment, the combination with valve means for controlling the application and the release of the brakes, of a plurality of magnets for controlling the operation of said valve means, a valve for controlling the release of the brakes independently of said valve means, a magnet for controlling the operation of said valve, and a brake switch device for controlling the operation of said magnets.

6. In a locomotive brake equipment, the combination with a brake pipe, of an equalizing valve device for controlling the application and release of brakes and movable to release position upon an increase in brake pipe pressure, valve means for controlling the application and release of brakes independently of said equalizing valve device, magnets for controlling the operation of said valve means, a valve for controlling the release of brakes independently of said valve means when said equalizing valve device is in release position, a magnet for controlling the operation of said valve, and a brake switch device for controlling the operation of said magnets.

7. In a locomotive brake equipment, the combination with a brake cylinder, of a relay valve device operated upon an increase in fluid pressure for supplying fluid under pressure to the brake cylinder and upon a decrease in fluid pressure for releasing fluid from the brake cylinder, a controlling valve device for varying the fluid pressure on said relay valve device and comprising a valve having a position for supplying fluid to said relay valve device, a position for releasing fluid from said relay valve device and an intermediate lap position, differential pistons operated by variations in fluid pressure for operating said valve, an electrically controlled means for varying the fluid pressure on each of said pistons, and resilient means for opposing movement of said controlling valve device from its lap position.

8. In a locomotive brake equipment, the combination with a brake cylinder, of a relay valve device operated upon an increase in fluid pressure for supplying fluid under pressure to the brake cylinder and upon a decrease in fluid pressure for releasing fluid from the brake cylinder, a controlling valve device for varying the fluid pressure on said relay valve device and comprising a valve having a position for supplying fluid to said relay valve device, a position for releasing fluid from said relay valve device and an intermediate lap position, differential pistons operated by variations in fluid pressure for operating said valve, an electrically controlled means for varying the fluid pressure on each of said pistons, a magnet valve device for controlling a communication through which said valve supplies fluid under pressure to said relay valve device, and resilient means for opposing movement of said controlling valve device from its lap position.

9. In a locomotive brake equipment, the combination with a brake cylinder, of a relay valve device operated upon an increase in fluid pressure for supplying fluid under pressure to the brake cylinder and upon a decrease in fluid pressure for releasing fluid from the brake cylinder, a controlling valve device for varying the fluid pressure on said relay valve device and comprising a valve having a position for supplying fluid to said relay valve device, a position for releasing fluid from said relay valve device and an intermediate lap position, differential pistons operated by variations in fluid pressure for operating said valve, an electrically controlled means for varying the fluid pressure on each of said pistons, resilient means for opposing movement of said controlling valve device from its lap position, and a magnet valve device for releasing fluid from said relay valve device independently of the position of said controlling valve device.

In testimony whereof I have hereunto set my hand.

MABLE M. THOMAS,
*Executrix of the Last Will and Testament of Thomas H. Thomas, Deceased.*